Sept. 16, 1941.  B. A. PARKES ET AL  2,256,327

FLATWORK DRYING, FOLDING, PRESSING, AND COUNTING MACHINE

Filed Dec. 2, 1938  9 Sheets-Sheet 1

INVENTORS.
BERTRAND A. PARKES
RALPH C. PARKES,
BY Louis Necho
ATTORNEY

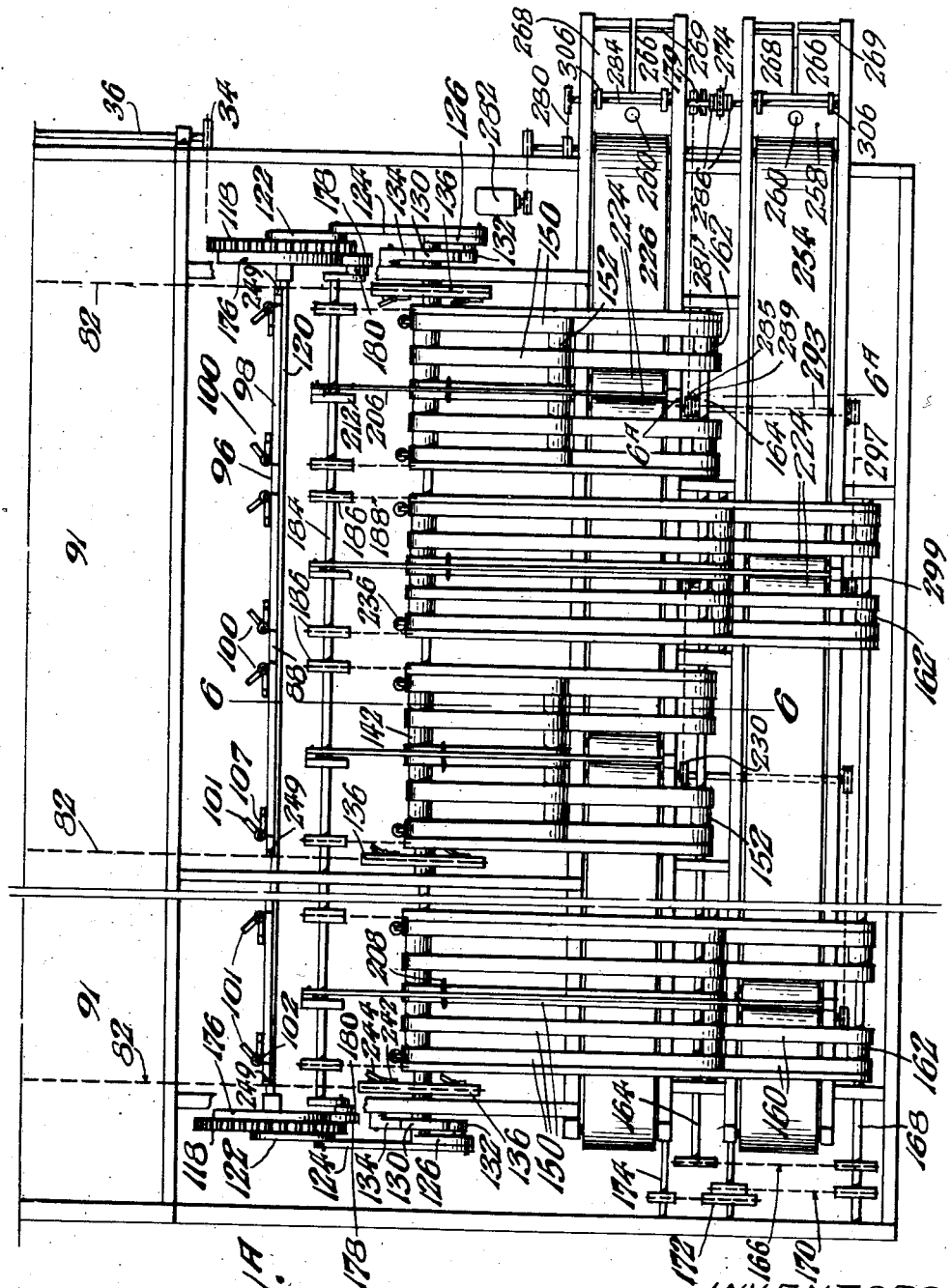

Sept. 16, 1941.　　B. A. PARKES ET AL　　2,256,327
FLATWORK DRYING, FOLDING, PRESSING, AND COUNTING MACHINE
Filed Dec. 2, 1938　　9 Sheets-Sheet 3
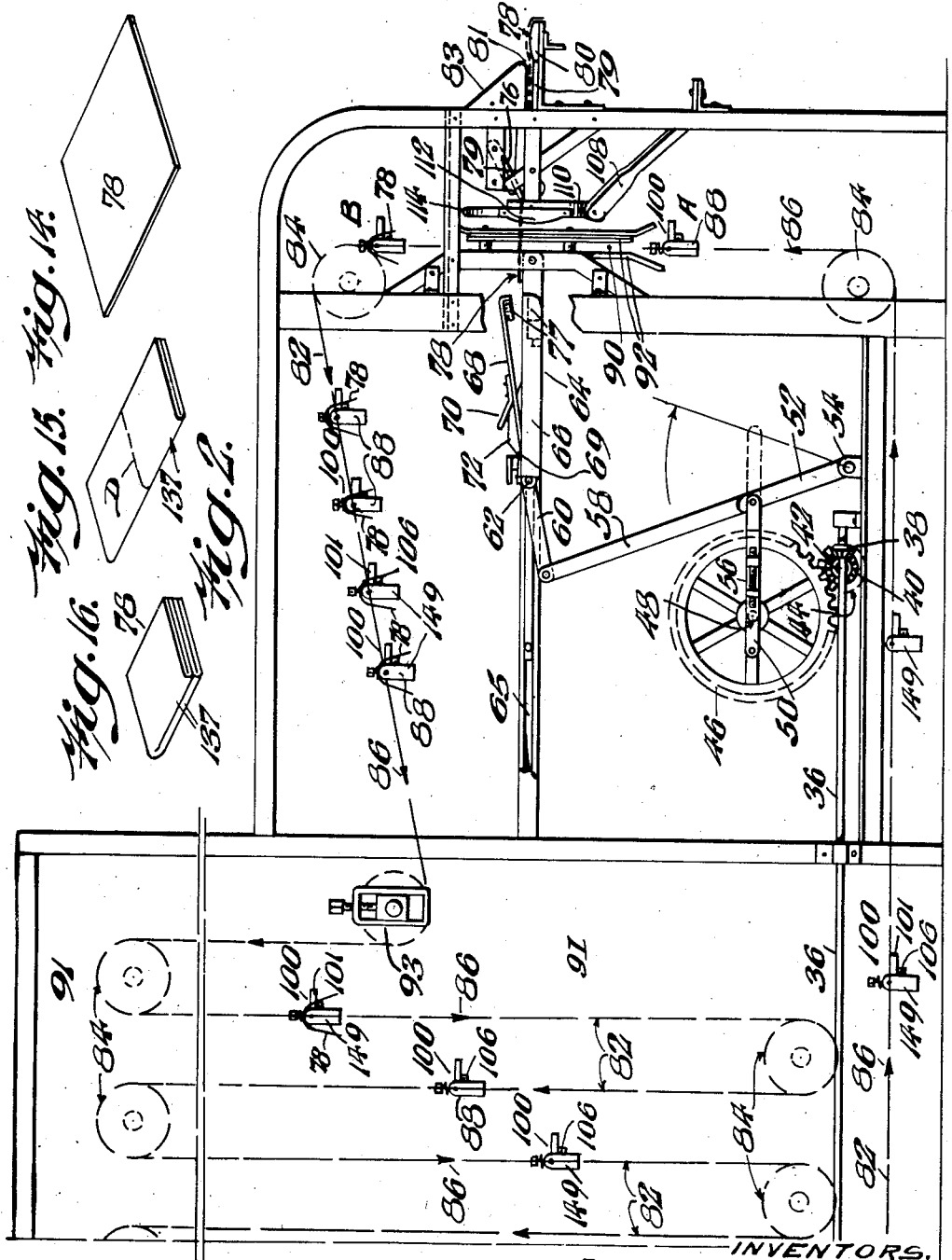
INVENTORS.
BERTRAND A. PARKES.
RALPH C. PARKES.
BY Louis Necho
ATTORNEY

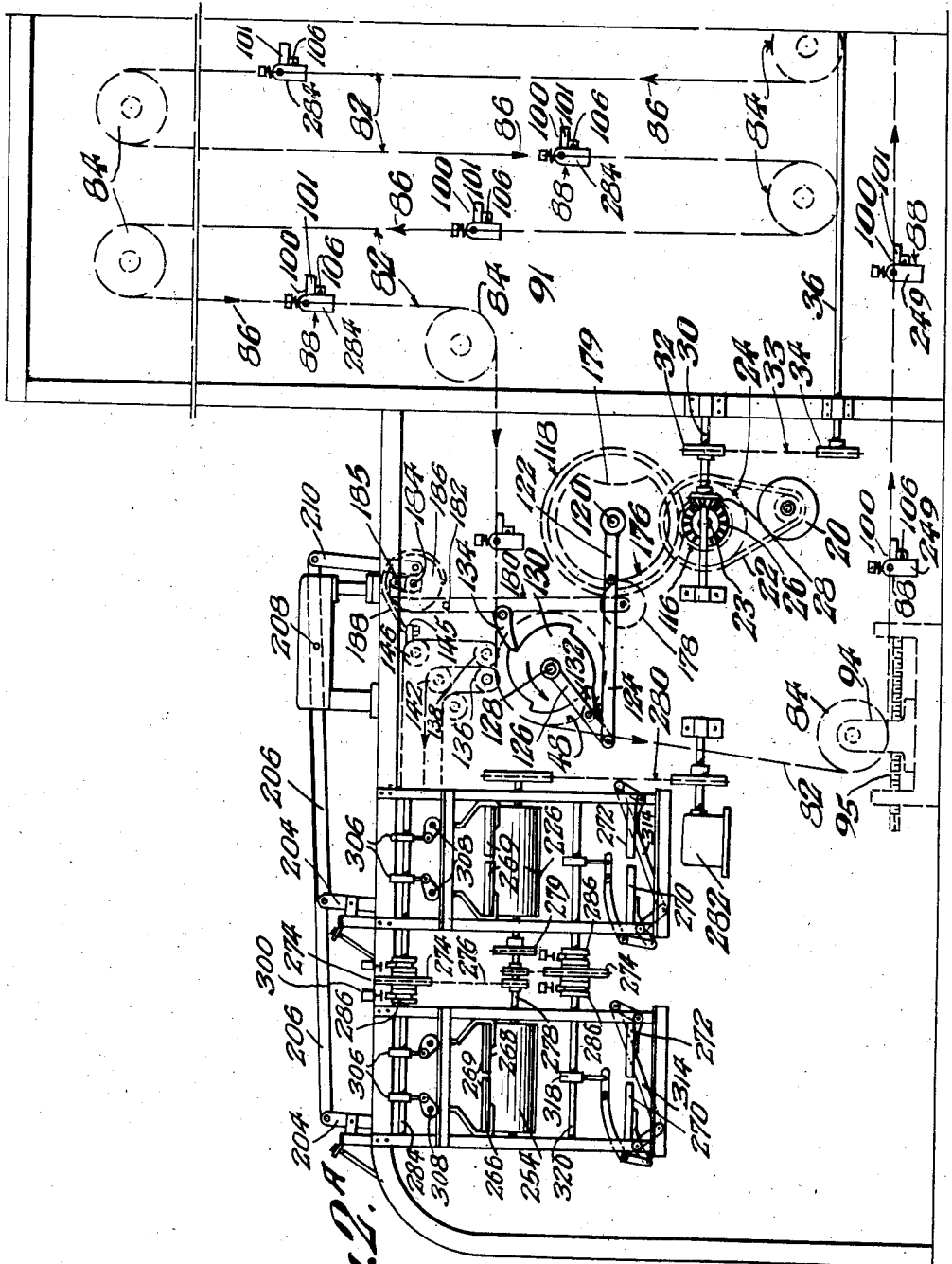

Sept. 16, 1941.  B. A. PARKES ET AL  2,256,327
FLATWORK DRYING, FOLDING, PRESSING, AND COUNTING MACHINE
Filed Dec. 2, 1938  9 Sheets-Sheet 5
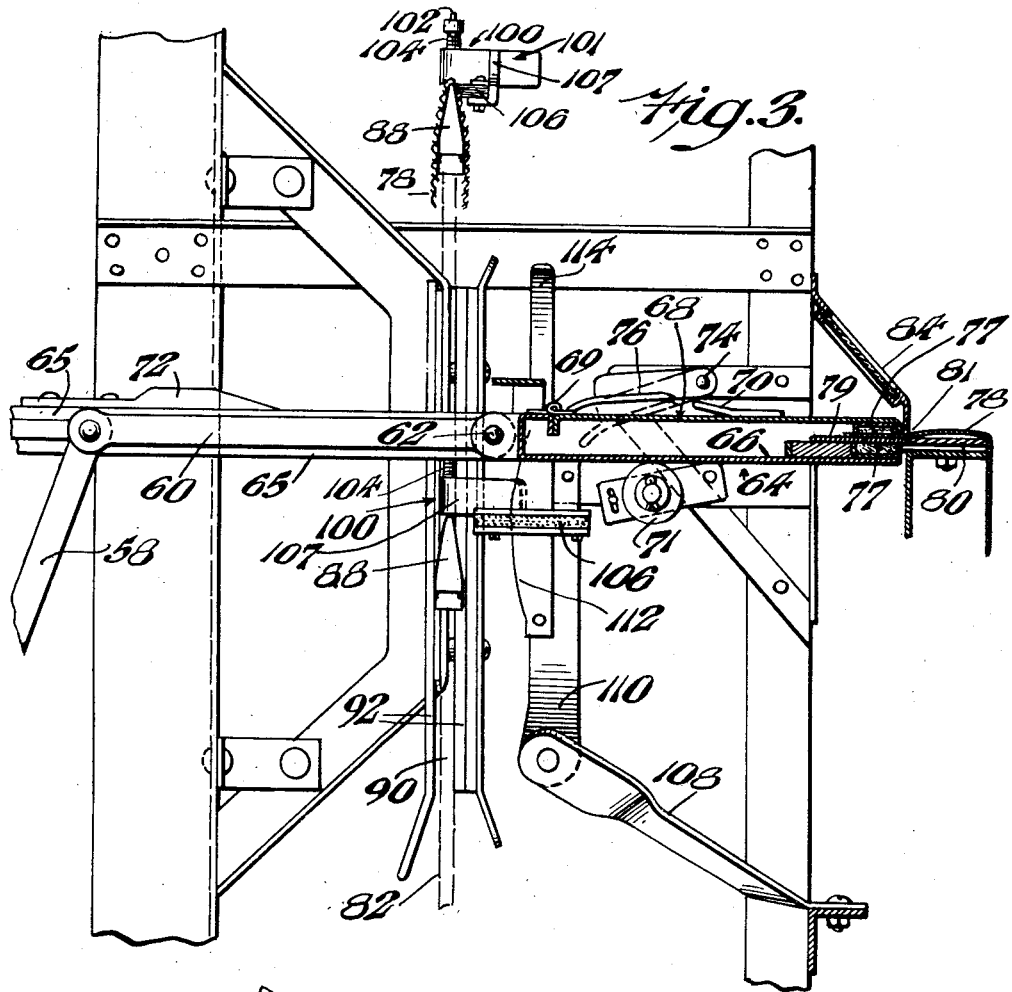
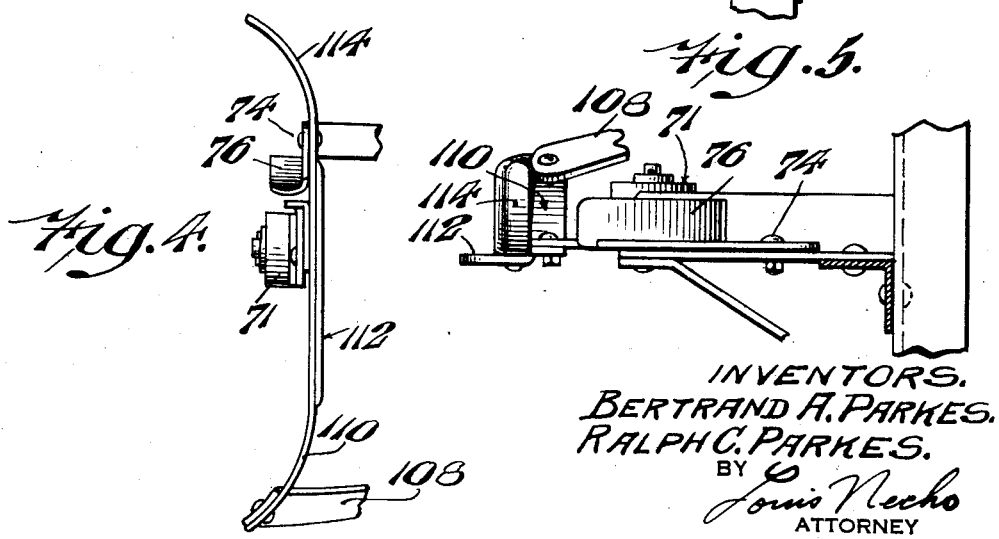
INVENTORS.
BERTRAND A. PARKES.
RALPH C. PARKES.
BY Louis Necho
ATTORNEY

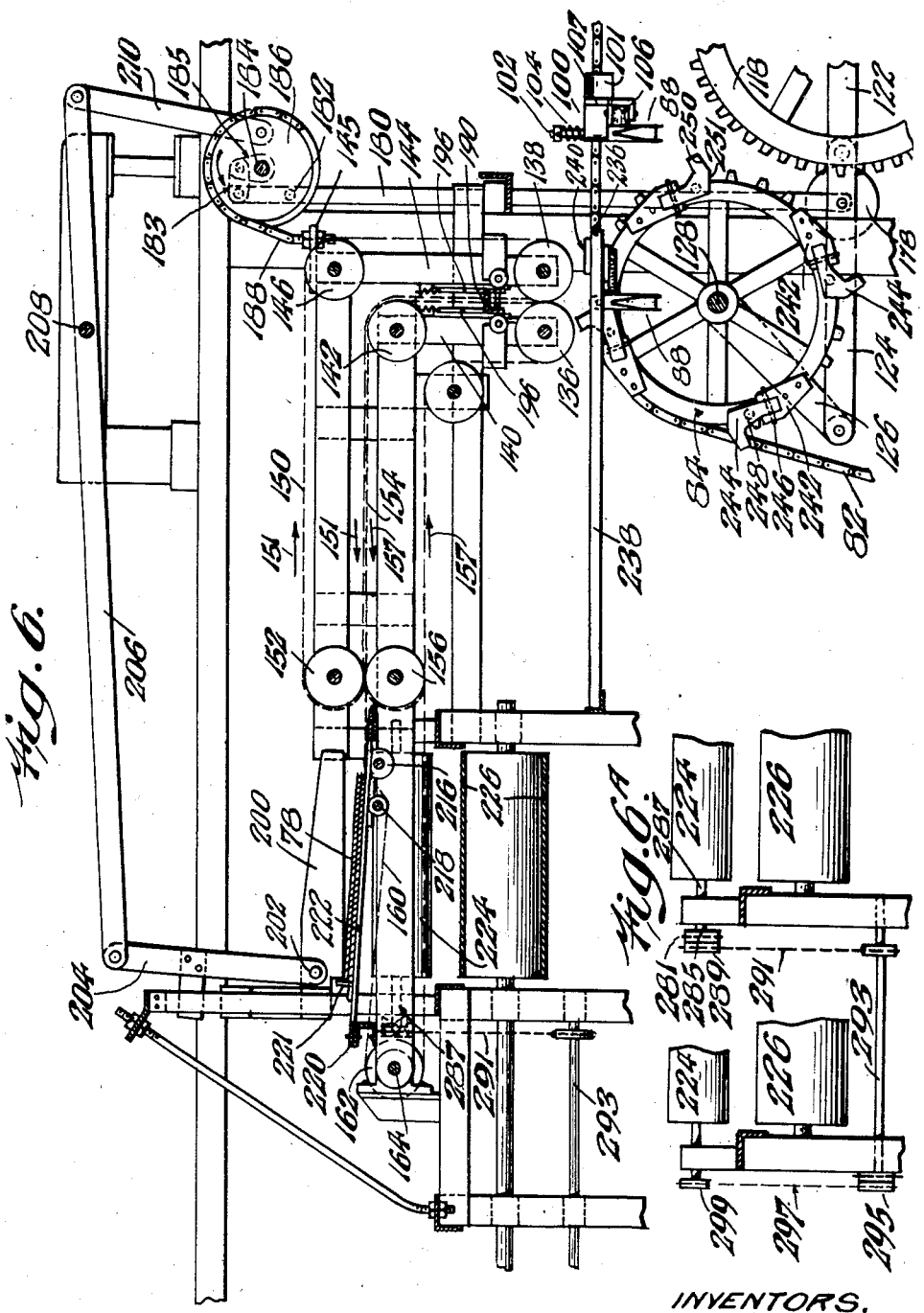

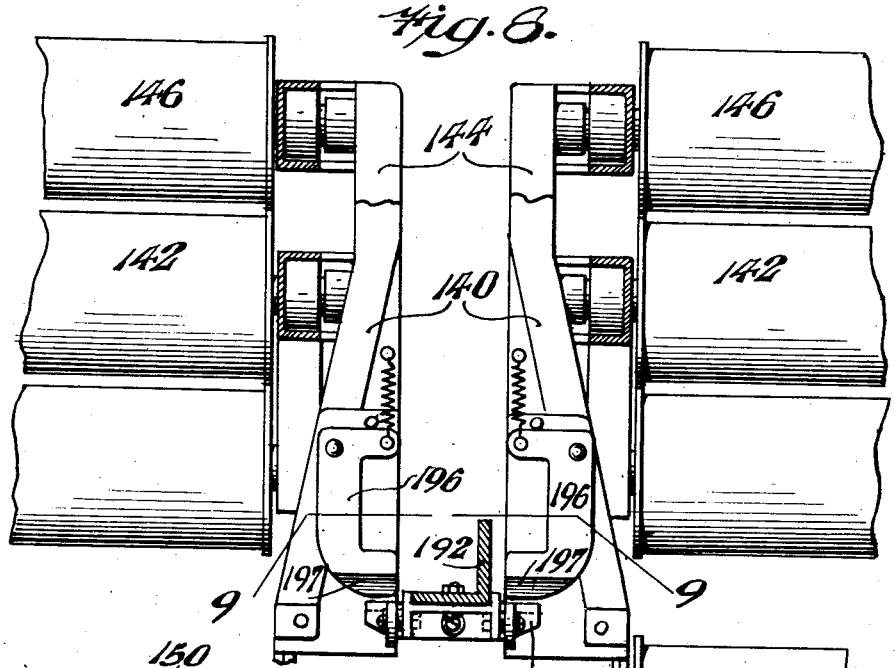
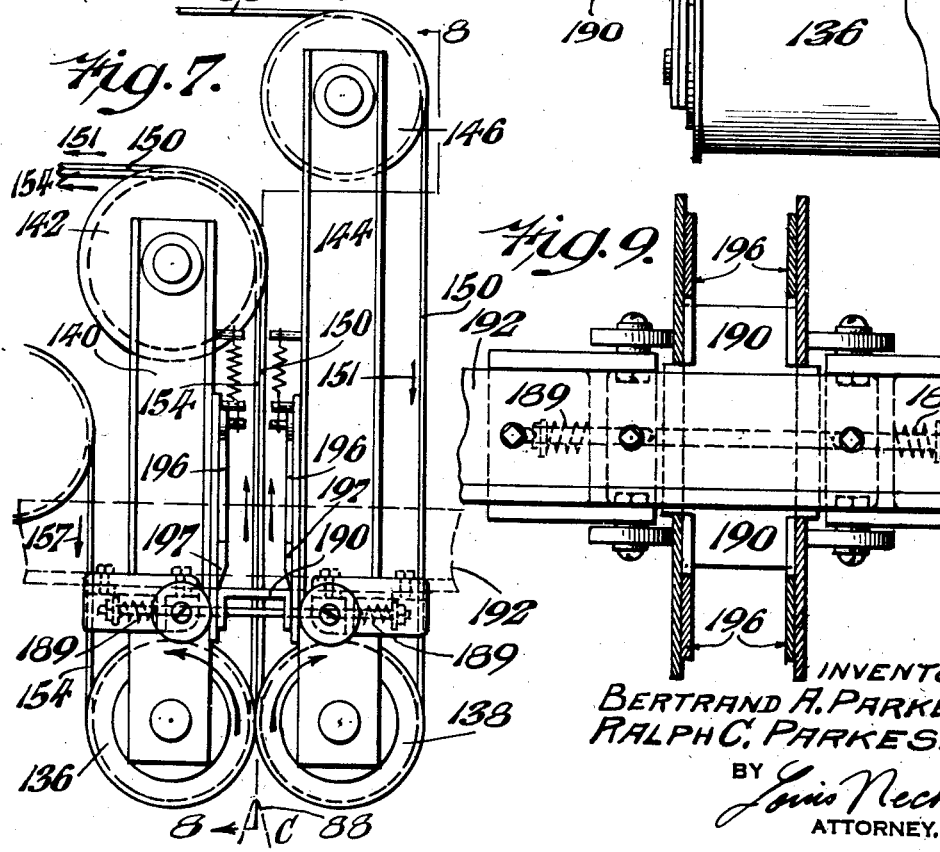

Sept. 16, 1941.  B. A. PARKES ET AL  2,256,327
FLATWORK DRYING, FOLDING, PRESSING, AND COUNTING MACHINE
Filed Dec. 2, 1938  9 Sheets-Sheet 8
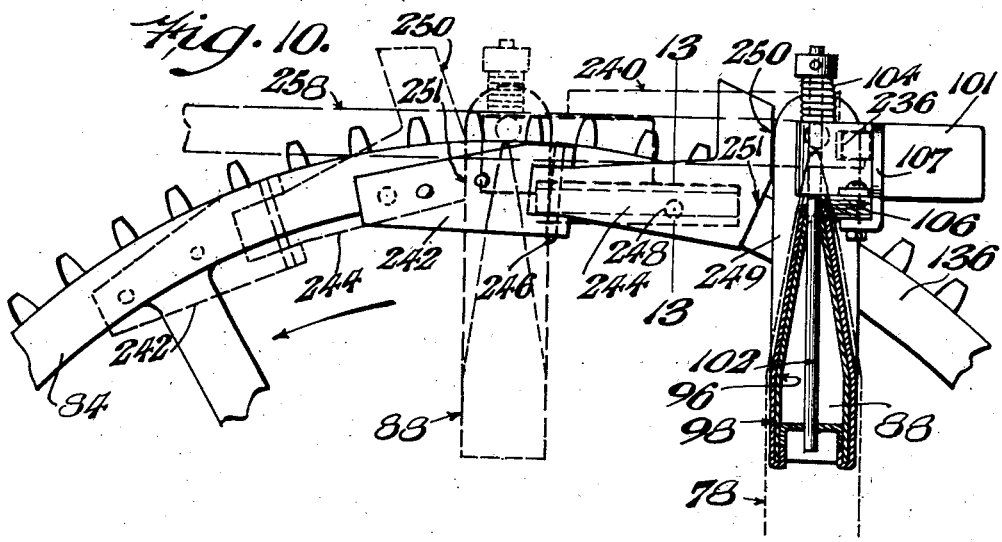
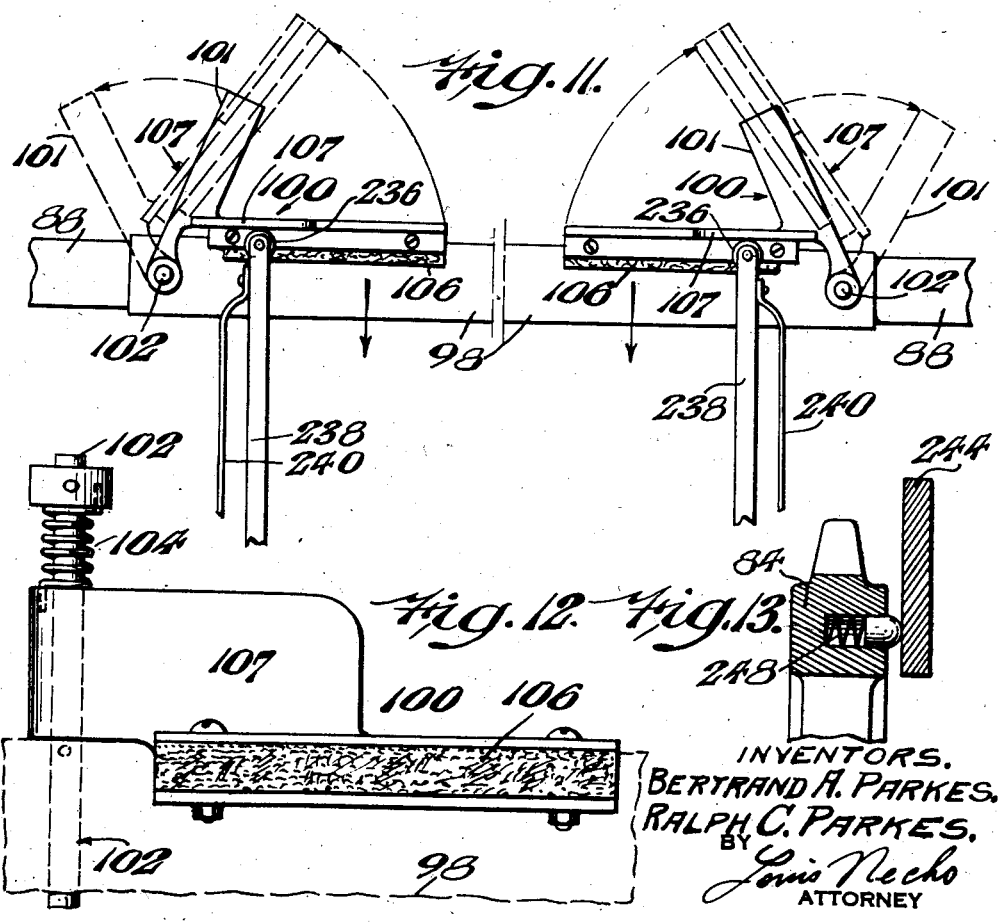

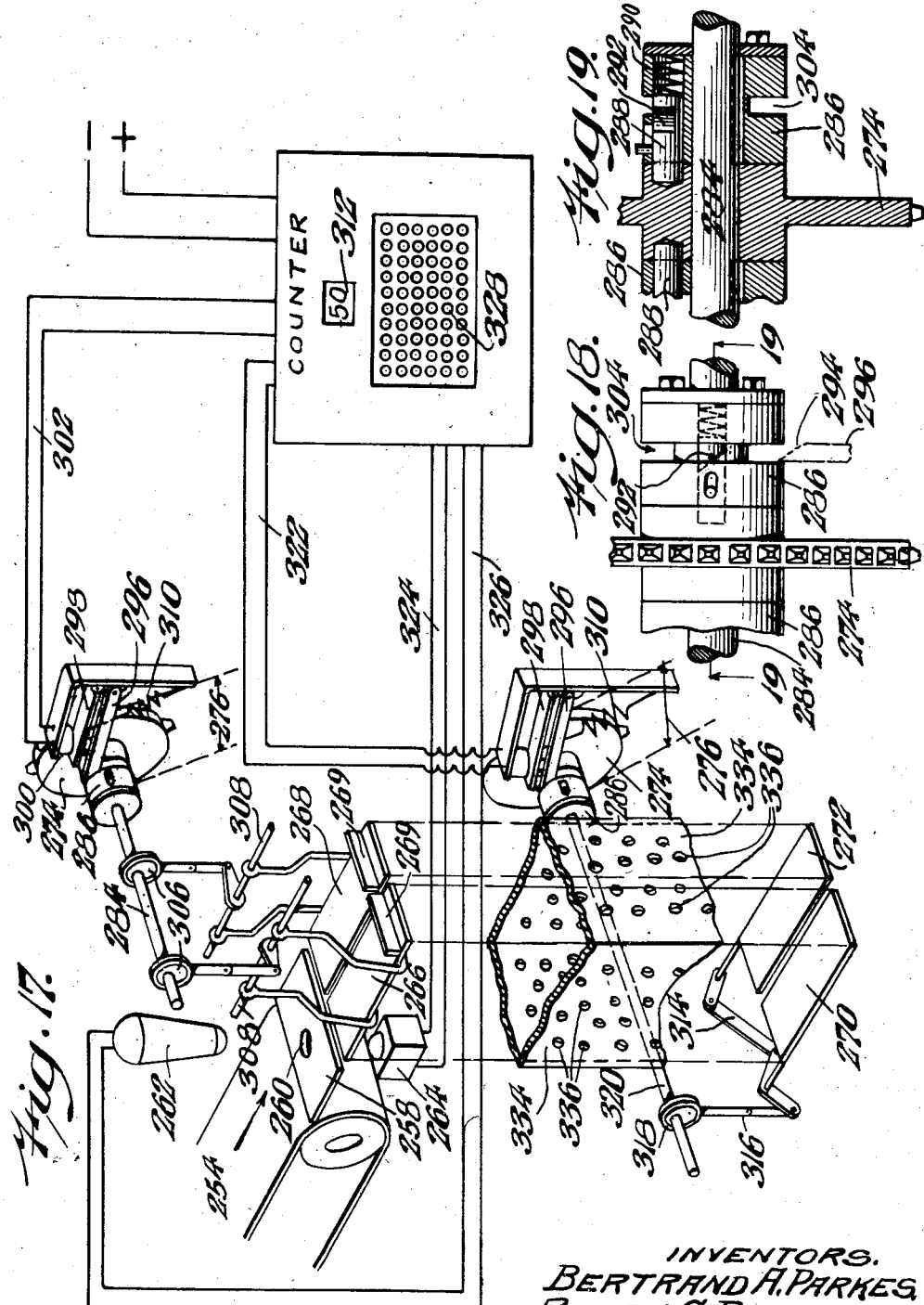

Patented Sept. 16, 1941

2,256,327

UNITED STATES PATENT OFFICE 2,256,327

FLATWORK DRYING, FOLDING, PRESSING, AND COUNTING MACHINE

Bertrand A. Parkes and Ralph C. Parkes, Philadelphia, Pa.

Application December 2, 1938, Serial No. 243,570

8 Claims. (Cl. 38—2)

Our invention relates to a new and useful flat work ironing, drying, folding and counting machine for use in industrial laundries for the handling of diapers, napkins, towels and similar flat work.

Industrial laundries, that is, those serving relatively large establishments such as hospitals and other institutions and which also take bulk work from smaller so-called "hand laundries" often handle large quantities of flat pieces such as thousands of napkins, diapers, towels, or the like, which must be dried, ironed, folded and counted, and, as far as we are aware, a machine for accomplishing all of these functions automatically, and which only requires the feeding of the flat work thereto, has not been heretofore known or used.

It is also necessary in a machine of this character, especially when handling a large number of pieces of flat work for a given institution or customer, not only to count the same, but also to divide them into batches of a predetermined size for convenient handling and delivery and this, as far as we are aware, has never heretofore been accomplished in this field.

With these objects in view we have devised, built and successfully operated a machine into which a plurality of pieces of flat work can be fed simultaneously and in which such pieces of flat work are propelled through a drying chamber, are folded, smoothed or ironed as they are being folded, delivered to a counting mechanism which registers the total number of pieces handled, and to another counting mechanism which subdivides the pieces handled into batches of any desired, predetermined number.

Generally speaking our novel machine comprises means for receiving pieces of flat work to be handled and centering them with respect to conveyors which carry them into the drying chamber, means for picking the pieces of flat work in a partially folded condition from said conveyors and simultaneously subjecting them to an ironing or smoothing operation, means for further folding the pieces of flat work and dropping them onto a moving belt conveyor and, finally, means for counting all the pieces handled and for segregating them in predetermined numbers.

The structure and operation of our novel machine will be more clearly understood from the following specification and the accompanying drawings in which:

Figs. 1 and 1a represent a plan view of a machine embodying our invention, certain parts being omitted.

Figs. 2 and 2a represent a side elevation of a machine embodying our invention, certain parts being omitted.

Fig. 3 represents on a slightly enlarged scale a view partly in section and partly in elevation on line 3—3 of Fig. 1.

Figs. 4 and 5 represent details of construction of certain of the parts shown in Fig. 3.

Fig. 6 represents on an enlarged scale a section on line 6—6 of Fig. 1a.

Fig. 6a represents on an enlarged scale a fragmentary view partly in section and partly in elevation on line 6a—6a of Fig. 1a.

Fig. 7 represents on an enlarged scale a side view of the mechanism for lifting the flat work from the conveyor after it is dried.

Fig. 8 represents a section on line 8—8 of Fig. 7.

Fig. 9 represents a section on line 9—9 of Fig. 3.

Fig. 10 represents on an enlarged scale a fragmentary view of the mechanism shown at the lower right hand corner of Fig. 6 the flat work supporting pole being shown in section.

Fig. 11 represents diagrammatically a mechanism for releasing the clamps normally holding the flat work on the pole prior to the lifting of the flat work from the pole.

Fig. 12 represents on an enlarged scale a side elevation of the left hand half of Fig. 11 showing the pole in dotted lines.

Fig. 13 is a section on line 13—13 of Fig. 10.

Fig. 14 represents a perspective view of a piece of flat work after it is dried but before it is folded.

Fig. 15 represents a view of the flat work shown in Fig. 14, the same being partly folded.

Fig. 16 represents a similar view to Fig. 15 showing the flat work completely folded.

Fig. 17 represents diagrammatically and in perspective the counting mechanism.

Fig. 18 represents a fragmentary plan view on a slightly enlarged scale showing details of the counting mechanism construction.

Fig. 19 represents a section on line 19—19 of Fig. 18.

Figure 1:
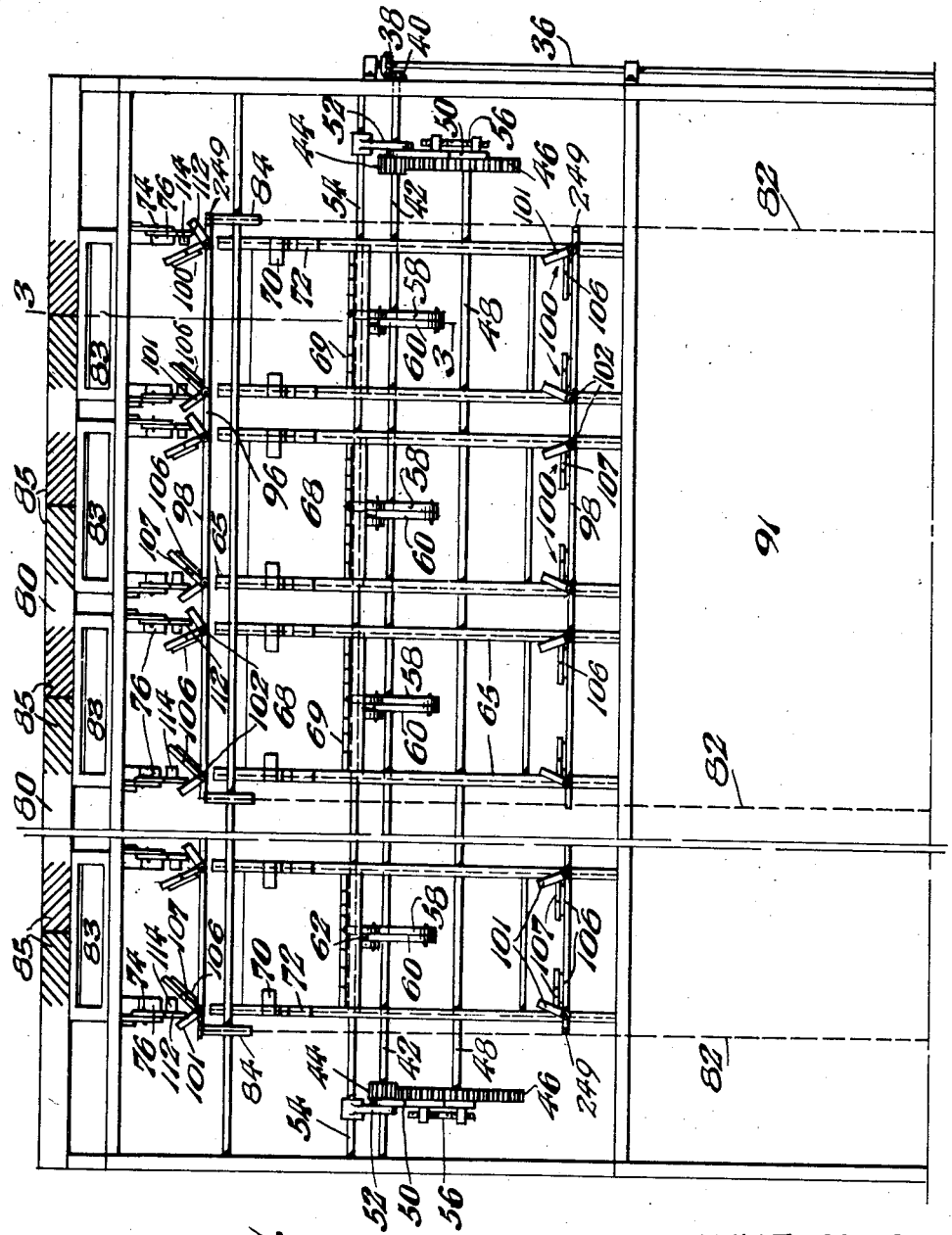

Referring to the drawings in which like reference characters indicate like parts, and more particularly to Fig. 2a, 20 designates a motor or other source of power which drives the belt or sprocket chain 22 to turn the sprocket wheel or pulley 24 which is mounted on a shaft 23 which also carries the bevelled gear 26 which meshes with the bevelled gear 28 on the shaft 30. The shaft 30 carries the sprocket or pulley 32 which, by means of a belt or sprocket chain 33 drives the pulley or sprocket 34 on the shaft 36. The shaft 36 carries the bevelled gear 38 which meshes with the bevelled gear 40 to drive the shaft 42. As will be best seen from Fig. 1 the shaft 42 carries the end cogs 44 which mesh with gears 46 mounted on the shaft 48 to drive the latter. On the spokes of the opposite end gears 46 are pivoted the crank arms 50 which are pivoted at their other ends to the rocker arms 52 which are fast on the shaft 54. The crank arms 50 are provided with any suitable adjustment 56. As seen from Figs. 1 and 2 the shaft 54 is provided with a number of bell cranks 58 which are connected through the links 60 to the rear ends 62 of the clamping mechanisms 64 which are adapted to be reciprocated to the right and left as seen in Fig. 2 to clamp or release pieces of flat work such as diapers, napkins or the like, in a manner hereinafter to be described. Each of the clamping mechanisms 64 consists of the fixed lower jaw 66 and the movable upper jaw 68 which is hinged at 69 and which is shown in its rear, releasing position in Fig. 2 and in its forward, clamping position in Fig. 3. When the clamping mechanism 64 is in its rear, releasing position as shown in Fig. 2, it is supported and guided by the rails 65, and when the clamping mechanism 64 is in its forward, clamping position as shown in Fig. 3, it rides on the supporting and guiding rollers 71. In order to open the clamping mechanism 64 on its rearward stroke (to the left of Fig. 2) to release the flat work previously held thereby, we provide the upper jaw 68 with a cam 70 which is adapted to ride over a cam 72 carried by the frame of the machine. This raises the hinged member 68 from contact with the lower member 66 as shown in Fig. 2. On the return, or forward stroke of the clamping mechanism 64 (to the right as shown in Fig. 2) the cam 70 has dropped off the cam 72, and the upper movable jaw 68 drops into clamping position upon the lower jaw 66. In order again to open the clamping mechanism 64 for the reception of a piece of flat work, we pivot to the frame of machine as at 74 the cam 76, so that, as the clamping mechanism moves towards the feed or forward end of the machine, the cam 70 (see Figs. 1 and 2) rides over the cam 76 thus again opening the clamping mechanism 64 by raising the arm 68. The upper and lower members 68 and 66 of the clamping mechanism 64 are provided with the cushions 77 for adequate engagement with the flat work 78. In this position of the parts the flat work 78 is placed on the feed table 80 and its leading edge is introduced through the slot 81 in the front guard 83 of the machine. The guard 83 is provided with a transparent section through which the operator can observe the feeding of the flat work 78 to the clamping mechanism 64. The leading edge of the flat work 78 rests on the platform 79 in advance of the clamping mechanism and with the clamping mechanism still moving to the right in Fig. 2 the cam 70 drops off the cam 76 whereupon the upper member 68 of the clamping mechanism drops on the flat work 78 resting on the platform 79 with the lower jaw or arm 66 disposed below the platform 79. As the clamping mechanism 64 is moved rearwardly (to the left of Fig. 2) the flatwork 78 is drawn off the platform 79 and assumes the position shown in dotted lines in Fig. 2. The feed table 80 is provided on its upper or effective surface with the diverging ridges 85 which tend to spread the flat work 78 as the latter is drawn over the feed table 80 on its way into the machine.

In order to carry the flat work from the clamping mechanism into the drying chamber we provide a carrier consisting of a suitable conveyor 82 travelling over the sprockets or pulleys 84 in the direction of the arrows 86. The conveyor 82 carries a series of suitably spaced poles 88. As the clamping mechanism nears the position shown in Fig. 2, one of the poles 88 moves upwardly in the space 90 between the guides 92 into a position corresponding to the center of the flat work 78 so that, as the pole 88 travels from the position shown at A to the position shown at B, the flat work is draped over the pole with half of the piece of flat work on each side of the pole. This is clearly shown in Figs. 2 and 3. In this position the flat work is carried into the drying chamber 91 where it is subjected to the action of hot air or other drying medium and in order to prolong the travel of the flat work in the drying chamber without at the same time increasing the length of the drying chamber, the poles 88 travel up and down between the upper and lower sprockets 84 as shown in dotted lines in Figs. 2 and 2a. 93 designates a tensioning mechanism for taking up the slack on the conveyor 82. The conveyor is also adjusted by mounting one of the sprockets 84 upon the bracket 94 which is engaged by the threaded element 95 so that it may be moved to the right or to the left of Fig. 2a as desired. The poles 88 are preferably constructed of internal members of ordinary sheet iron or the like 96 and are covered with rust-proof jackets 98 such as stainless steel or the like. In order to retain the flat work 78 on the pole 88 from the feed end of the machine into and through the drying chamber 91, we provide each pole with a plurality of clamps 100 which are mounted on the rods 102 which are carried by the poles 88. The clamps 100 are actuated by the spring 104 into constant engagement with, or clamping position against, the pole 88. Each of the clamps 100 is provided with a relatively soft or resilient, effective or clamping edge 106, to prevent slippage and to insure against damaging the flat work 78. As the pole 88 approaches the front or feed end of the machine it is obviously necessary that the clamps 100 be opened in order to permit the draping of the flat work 78 onto the pole and for that purpose we secure to the frame of the machine the arm 108 to which is secured the curved arm 110 (see Figs. 2 and 3), so that, as the projecting end 107 of the clamp 100 rides against the lower end of the curved arm 110, the clamp 100 is slightly opened against the tension of the spring 104. As the pole 88 progresses further upwardly the end 107 of the clamp 100 rides against the cam surface 112 in which position the clamp is completely opened. When the pole 88 has passed the horizontal center of the opening 90, the clamp 100 has cleared the high point of the cam 112 and gradually closes upon the flat work 78 which is now draped on the pole 88. In order to insure gradual closing without any snapping, the clamp 100 is made to ride upon the oppositely curved cam surface 114. The flat work 78 is now firmly clamped on the pole while it travels through the drying chamber 91.

In order to impart to the conveyor 82 a step by step movement we provide the shaft 23 with the end gears 116 which mesh with gears 118 on the shaft 120. The shaft 120 carries the rocker arms 122 which are secured to the crank arms 124 which are pivoted to the links 126. The other end of the links 126 are journalled on the shaft 128. On the shaft 128 are the end ratchet wheels 130. The links 126 carry the spring-pressed dogs 132 which are adapted to engage the spaced notches of the ratchet wheels 130 to propel the latter and on the frame of the machine are also mounted the pawls 134 which prevent retrograde movement of the ratchet wheels 130. The shaft 128 rotates one of the sprocket wheels 84 which engage the conveyor 82 thus propelling it step by step according to the propulsion of the ratchet wheels 130.

In order to remove the flat work 78 from the poles 88 we provide a pickup mechanism which engages the flat work 78 along the center fold 137, and thus lifts the flat work 78 from the pole 88 in the folded condition shown in Fig. 15. With the pickup mechanism we combine means for further folding the flat work and dropping it onto a delivery conveyor hereinafter to be described. The pickup mechanism consists of a pair of rollers 136 and 138 between which the fold line 137 of the flat work 78 on the pole 88 is adapted to be engaged. The roller 136 is carried by the bracket 140 which also carries the roller 142. The roller 138 is similarly carried by the bracket 144 which also carries the roller 146. 150 designates a belt which travels endlessly in the direction of the arrow 151 over the rollers 138, 146 and 152. 154 designates another belt which travels over the rollers 136, 142 and 156 in the direction of the arrow 157. 160 designates still another belt which travels over the rollers 136, 142 and 162 and back under the roller 156. The roller 162 is on the shaft 164 which is driven by the belt or sprocket chain 166 from the shaft 168. The shaft 168 is driven by the belt or sprocket chain 170 and the pulley or sprocket 172 which in turn is driven by the shaft 174 of a motor (not shown). The brackets 140 and 144 are normally in a raised position so that the rollers 136 and 138 clear the tops of the poles 88. When the pole 88, on which a piece of flat work 78 is folded in half, reaches the point C (see Fig. 7) it is necessary to drop the rollers 136 and 138 towards the pole, to pick up the folded piece of flat work. This is accomplished by the cam 176 which turns with the cog wheel 118 and on which is adapted to ride the roller 178 fulcrumed at 182 to the frame of the machine. The arm 180 is pivoted at its upper end to the link 183 which is secured to the arm 185 which is secured to the rock shaft 184 which carries the wheel 186. (See Figs. 2a and 6.) Around the wheel 186 is a chain or other flexible element 188 which is suitably secured to the bracket 144 at 145. In this way when the wheel 178 rides on the round or concentric portion of the cam 176 the rollers 136 and 138 and the brackets 140 and 144 remain in their upper position, but, when the wheel 178 rides on the convex portion 179 of the cam 176, the arm 180 swings to the right of Fig. 2a thus permitting the wheel 186 to turn in counter-clockwise direction and thus pays the chain 188. This allows the brackets 140 and 144 to drop and bring the rollers 136 and 138 into engagement with the flat work 78 on the pole 88. The rollers 136 and 138 are normally urged into contact with each other, as shown in Fig. 7, by the springs 189, and, in order to space them apart to permit entry of the folded edge 137 of the flatwork 78 therebetween, we provide the bracket 190 which is suitably secured to the portion 192 of the frame, and we also provide the brackets 140 and 144 with the oppositely disposed cams 196 having the lower bevelled edges 197, so that, as the brackets 140 and 144 are lowered, the cams 197 riding upon the opposite sides of the fixed bracket 190, force the rollers 136 and 138 apart against the action of the springs 189. In this spaced condition the rollers 136 and 138 are lowered down upon the pole 88 and, after contacting the surfaces of the flat work 78, the brackets 140 and 144 are again raised by the wheel 178 leaving the concave portion 179 of the cam 176 and again riding upon the high portion thereof to turn the wheel 186 in clockwise direction and wind the chain 188 thereon. The piece of flat work folded in half, which has been engaged by the contacting and rotating rollers 136 and 138 now travels between the belts 150 and 154 and between the rollers 156 and 152 on its way to the delivery belt. In order to fold the flat work 78 in half again, we provide the knife 200 which is pivoted at 202 to the arm 204. The arm 204 is pivoted to the rocker arm 206 which is fulcrumed at 208 and which, at its other end, is pivoted to the bell crank 210 which is actuated by the wheel 212 on the shaft 184 which also carries the wheel 186. In this way the knife 200 is reciprocated in timed relationship with the arrival of the already once folded piece of flat work 78 thereunder. In order to present the folded flat work to the lower edge of the knife 200 we provided the rollers 216 and 218, the latter being completely under the platform 220 while the roller 216 is positioned in registration with an opening near the front end of the platform 220. In this way the belt 160 which carries the flat work 78 goes under the platform 220 and the flat work 78 itself rides on the platform 220 which is provided with a rear stop 221. The platform 220 is of a size sufficient to accommodate the particular piece of flat work 78 to be handled and is provided with a central slot 222 so that the initially longitudinally folded flat work 78, as shown in Fig. 15, will, when placed on the platform, be folded once again when the knife drops thereover into the slot 222. When the knife 200 drops over the flat work 78 through the slot 222, it not only folds again the already once folded piece of flat work 78 into the form shown in Fig. 16, but it also delivers the newly folded edge thereof to a pair of coacting, longitudinal rollers 224, which deliver the flat work 78 onto the delivery belt 226. The rollers 224 are actuated in a manner hereinafter described. As each of the poles 88 approaches the point at which the rollers 136 and 138 are ready to pick up the flat work folded thereover, it is necessary to open the clamps 100 which hold the flat work on the poles and this is accomplished by means of the rollers 236 carried by the stationary arms 238 which are positioned immediately in advance of the pick-up position C so as to obstruct the path of the clamps 100 by engaging the arms 101 of the clamps 100 and thus compel the latter to open just before the poles 88 reach the position C below the rollers 136 and 138 as shown in Fig. 7. The clamps 100 are held open through the necessary predetermined distance of their movement by the flat spring 240. In order to prevent the vibration of the machine from unbalancing or even dropping the flat work 78 off the poles 88 while the clamps 100 are open and before the flat work 78 has been picked up by the rollers 136 and 138, we provide on the wheel 136 the plates 242 to which are pivoted the extensions 244 by means of the pins 246, the extensions 244 being pressed outwardly by the springs 248. The extensions 244 are so spaced on the wheel 136 that immediately before disengagement of the clamps 100 by the roller 236 the faces 250 of the spring-pressed extensions 244 engage the end supports 249 of the poles 88. As the pole 88 moves from the position shown in solid lines to that shown in broken lines in Fig. 10, the face 250 of the extension 244 is disengaged from contact with the end support 249 and the bevelled face 251 engages the end support 249 while the flat work 78 is being picked up by the rollers 136 and 138.

In connection with the cross-sectional view shown in Fig. 6 we have shown only the delivery belt 226 because of the location at which the cross section is taken and the limitation of space. It will be seen from Fig. 1a that next to the belt 226 there is another belt 254 which runs parallel to the belt 226, the belt 226 and 254 receiving respectively alternate pieces of folded flat work 78 from the poles 88. As shown in Fig. 1 the machine has been built to feed, dry, fold and deliver four pieces of flat work 78 from each pole 88, but this illustration is only for the purpose of convenience and due to the difficulty of adequately illustrating a larger machine, and it is explained at this point that the actual machine from which these drawings were made had accommodation for the handling of a greater number of pieces of flat work than shown and described. Thus, if the pole 88 were to be provided with twelve clamps 100 dividing it into six sections, we will have a corresponding number of sets of pickup rollers 136, 138, which will deliver alternating folded pieces of flat work to the belts 226 and 254 which, in that event, need only be made longer. Each of the belts 226 and 254 leads to a counting mechanism which is best illustrated in Figs. 2a and 17, and, for the purpose of this specification, we will describe only one of the counting mechanisms. Thus, the completely folded flat work 78, as shown in Fig. 16, which is delivered onto the belt 254 for instance passes over the platform 258 which has an opening 260 therein which is interposed between the two units 262 and 264 of a photoelectric cell. After passing over the platform 258 the folded flat work 78 is deposited onto the shelves 266 and 268 provided with the outer stops 269. The interruption of the light through the opening 260 swings the shelves 266 and 268 apart to drop the folded flat work onto the bottom shelves 270 and 272.

After the particular piece of flat work has dropped off, the shelves 266 and 268 are again brought together to receive the next piece of flat work, so that, the flat work 78 is dropped one piece at a time onto the lower shelves 270 and 272. In order to actuate the upper shelves 266 and 268 we provide the gear 274 which is constantly and freely rotated by the belt or sprocket chain 276 which is driven from the shaft 278 through the connection 280 from any suitable source of such as the motor 282. The sprocket 274 normally rotates freely on the shaft 284 and is only adapted to be interlocked with the collar 286 by means of the pin 288 which is urged by the spring 290. The pin 288 is provided with the bevelled edge 292 which is adapted to be engaged by the bevelled edge 294 of the arm 296. The arm 296 is suitably secured to the arm 298 which is adapted to be actuated by the electromagnet 300 which is energized by the circuit 302. The arm 296 normally lies in the groove 304 in the collar 286 so as to keep the pin 288 out of engagement with the gear 274 despite the urging of the spring 290. When the electromagnet 300 is energized it lifts the arm 298 and this moves the arm 296 out of the groove 304 whereupon the spring 290 urges the pin 288 into engaging position best shown in Fig. 19 thus integrating the collar 286 with the gear 274 and, since the collar 286 is keyed to the shaft 284, it follows that the shaft 284 is rotated when the arm 296 is withdrawn from the groove 304. The shaft 284 is provided with a pair of eccentrics 306 which, through suitable bell crank connections, are secured to the rods 308 which carry the shelves 266 and 268. Thus, by the rotation of the shaft 284 the shelves 266 and 268 are spaced apart to permit the piece of flat work which has been deposited on them to drop to the lower shelves 270 and 272, and, after the piece of flat work has been dropped, the shelves 266 and 268 are again brought to their normal position as shown in Fig. 17. If desired, the spring 310 may be used constantly to urge the arm 296 into the groove 304 to keep the pin 288 positively out of engagement with the gear 286 except when the electromagnet 300 is energized. The circuit 302 which is energized by a photoelectric cell by the passage of a piece of flat work over the opening 260, also actuated a counter 312 which registers the number of pieces of flat work 78 successively passing over the opening 260. If it is desired not only to count the pieces of flat work but also to deliver them in predetermined numbers, we provide the lower shelves 270 and 272 on which the pieces of flat work dropped from the shelves 266 and 268 are deposited until the predetermined number has been reached, whereupon the predetermined number is thus delivered, by the opening of the shelves 270 and 272, into a hamper or onto a conveyor or the like. In order to do this I connect the shelves 270 and 272 with a suitable toggle mechanism 314 which is connected by the link 316 to an eccentric 318 on the shaft 320. The shaft 320 is provided with the same actuating mechanism as the shaft 284, this actuating mechanism being connected by means of the circuit 322 to the counter 312. The photoelectro cells 262 and 264 are also connected by the circuits 324 and 326 to the counter 312. The counter 312, insofar as numbering the pieces of flat work passing over the opening 260, is of any conventional construction. However, the counter 312 is preferably provided with a setting mechanism by means of which the number of pieces of flat work, which are dropped from the shelves 266 and 268 onto the shelves 270 and 272 before the latter are allowed to open, is predetermined. Thus, if it is desired to deliver pieces of flat work in batches of fifty, the counter 312 is set to the figure "50" by pushing the button marked "50" of the buttons 328. When the counter 312 has thus been set, fifty pieces of flat work 78 will drop onto the shelves 270 and 272 whereupon the latter will open and deliver the fifty pieces of flat work in a single batch to the operator, a hamper, or a conveyor. If a greater or lesser number than fifty is desired for each batch, the appropriate button is pressed and the device is adjusted accordingly. The motor 282, which, through the connection 280, actuates the shaft 278 for operating the counting mechanism as already explained, also actuates the cog wheel 279 on the shaft 278. The cog wheel 279 through the connection 281 drives the cog wheel 285 on the shaft 287 of one of each pair of rollers 224 which receive the flat work 78 after it has been folded again from the condition shown in Fig. 15 to that shown in Fig. 16 and deliver it to the belt 226, the other of said pair of rollers 224 being frictionally driven. The shaft 287 also carries the cog wheel 289 which, through the connection 291 drives the shaft 293. The shaft 293 carries a cog wheel 295 which, through the connection 297, drives the sprocket 299 which propels one of the pair of rollers which deliver the folded flat work 78 onto the belt 254.

The operation is as follows:

The piece of flat work to be treated is fed to the machine in the condition shown in Fig. 14 by insertion of an edge thereof through the opening 81 in the guard 83. This involves the laying of the flat work 78 over the feed table 80 and the divergent grooves or ribs 85 tend to smooth out any wrinkles in the flat work as it progresses over the grooved surface 85 into the machine. The clamping element 64, as soon as the machine is started, begins to reciprocate from the right to the left as shown in Fig. 2 in timed relation with the movement of the poles 88. When the clamping mechanism 64 is in its extreme position to the right of Fig. 2, the jaw 68 is raised from the bottom jaw 66 so that the feed platform 79 and the leading edge of the flat work 78 will be disposed between the top and bottom cushions 71 of the jaws 66 and 68 when the arm 68 has fallen into its closing position upon the arm 66 as shown in Fig. 3 by the dropping of the cam 70 off the cam 76. As soon as this has taken place the clamping mechanism 64, through its actuating mechanism, begins its inward or retrograde movement to the left of Figs. 2 and 3 thus drawing the flat work 78 inwardly through the slot into the position shown in dotted lines in Fig. 2. When one of the poles 88, which have a step by step movement synchronized with the movement of the clamping element 64, has reached the position shown at A in Fig. 2, the flat work 78 is in the position shown in dotted lines with the center line of the flat work in registration with the top edge of the pole 88. The pole 88 now progresses upwardly through the opening 90 to the position marked B in Fig. 2 and in this way the flat work 78 is centrally draped over the pole 88, that is, with one-half of the flat work on one side of the pole and the other half of the flat work on the other side thereof. The poles 88 travel over the sprockets 84 by means of the conveyor 82, and, when any given pole has emerged from the drying chamber 91, it assumes the position shown at C in Fig. 7. While the pole 88 is stationary at the position C, the rollers 136—138 are dropped or lowered onto the pole 88 by the action of the roller 178 and the cam 176 and wheel 186 and they are also simultaneously spaced by the cams 196, 197 riding on the bracket 190. This spreads the rollers 136 and 138 while they descend upon the pole 88 and, since the rollers 136—138 are travelling in the direction of the arrows shown in Fig. 7, the flat work is picked up along the center line thereof and travels between the belts 150 and 154. This results in folding the flat work along the center line thereof, and the travel of the flat work between the rollers 136 and 138 and the belts 150 and 154 tends to have an ironing effect and the flat work now is in the condition shown in Fig. 15. The flat work is delivered from between the belts 150 and 154 onto the platform 220 and the knife 200, which is operated from the wheel 186 through the mechanism comprising the parts 204, 206, 208, 210, etc., now drops upon the center line D of the already once folded flat work as shown in Fig. 15 and feeds the newly formed edge or roll between the rollers 224 which further smooth the flat work in its newly folded condition as shown in Fig. 16 and deposit it either on the belt 226 or the belt 224 depending on the construction.

In order to retain the flat work firmly upon the pole 88 the clamps 100 are opened or spaced away from the poles and the pole travels past the point A towards the point B and, as soon as the flat work 78 has been draped over the pole 88, the clamps 100 are gradually closed to clamp the flat work on the pole before it reaches the point B. Similarly, the clamps 100 must be released immediately prior to the lifting of the flat work from the pole by the rollers 136 and 138 and this is accomplished by the rollers 236 which abut against the wings 107 of the clamps 100. In order to steady the pole 88 against vibration which might displace or unbalance the flat work draped thereover between the opening of the clamps by the rollers 236 and the actual engagement of the flat work 78 by the rollers 136 and 138 I provide the abutment plates 242 having the spring-pressed abutment extensions 244 against which the end supports 249 of the poles abut from the position shown in solid lines in Fig. 10 at which point the brackets 100 begin to open until the position shown in dotted lines in Fig. 10 is reached and at which the flat work 78 is lifted from the roller.

The completely folded flat work as shown in Fig. 16 is dropped onto the delivery belt 226 or 254 as the case may be and the number so delivered is registered by the counting mechanism 312 which is controlled by the photo-electric cells 262 and 264 by interruption of the beam normally passing through the opening 260 as the flat work 78 passes over the opening 260. The bottom shelves 270 and 272 are controlled by the counter 312 to open only at predetermined intervals corresponding to predetermined numbers of pieces of flat work which have passed over the opening 260 so that batches of 50, 60 or 70 or any desired number within practical limits can be grouped in separate batches.

From the foregoing specification, as well as in the description of the operation, we have specifically described the handling of one piece of flat work 78 on one pole 88 and we have also described the operation of one pick-up mechanism 136, 138, one folding knife 200, one clamping mechanism 100, one counting mechanism 312, and only one photo-electric cell assembly 260—264 and only one set of actuating shelves 260, 268, 270 and 272. But, if reference is had to Figs. 1 and 1a it will be seen that there are alternately arranged a plurality of sets of such mechanisms, some of said sets leading to the delivery belt 226 and one set of the counting mechanisms, and the other leading to the belt 224 and another set of counting mechanisms. Similarly, it will be seen that we have a plurality of poles 88 each of which is divided into sections by a plurality of sets of clamps 100 with one piece of flat work 78 held between each pair of clamps. Similarly, it will be understood that if a pole is divided into four segments to handle four pieces of flat work 78 simultaneously, there will be four slots 81, four feed tables 80, four clamping mechanisms 66 with corresponding means for raising and lowering the jaw 68, corresponding means for opening and closing the clamps 100, four pick-up mechanisms 136—138, etc., etc., except that there will be only two delivery belts 226 and 254 each leading to a separate counting mechanism as shown in Fig. 17.

It is to be noted that while we have used three different sources of power for actuating the various groups of the mechanisms forming part of our novel machine and it is also to be noted that the same is done only for the purpose of convenience since by appropriate gearing and belting the entire machine can be operated by a single source of motive power. Also, it is to be noted that as shown the same source of power operates similar or corresponding parts of the machine or such parts thereof as can be conveniently geared or belted to the same shaft. For instance, all the clamping mechanisms 64 that may be necessary are operated ultimately from the shaft 36, all the pick-up mechanisms 136—138 are lowered and raised by the cams 176 on the shaft 120 which also operates all the knives 200 that may be employed, etc., etc.

It will be noted that the poles 88 over which the flat work 78 is draped are wedge-shaped in cross section and taper upwardly to a point as best seen in dotted lines in Fig. 10 so that a sharp crease is produced when the damp flat work 78 is draped over said poles and passed through the drying chamber, which sharp crease or fold line 137 is engaged between the rollers 136 and 138. Also, it is to be noted that the cam 76 is pivoted at 74 so as to be in the way of the cam 70 while the clamping mechanism 64 is moving to the right of Figs. 2 and 3 to raise the upper jaw 68 and so that, when the arm 68 has dropped to its closing position, the cam 70 will move under the cam 76 on the return stroke of the clamping mechanism to the left of Figs. 2 and 3, and the pivoting of the cam 76 at 74 permits it to be raised into an out-of-the-way position by the cam 70 on its return stroke.

With respect to the counting mechanisms 266, 268, 270 and 272 it is pointed out that the flat work 78 travelling in the direction of the arrow towards the opening 260 would, in the absence of the construction disclosed, not be piled up neatly and in properly folded condition, since in the absence of the shelves 266 and 268 and the stops 269 the flat work 78 would tend to be thrown forwardly and drop in an arcuate manner. The function of the stops 269 is to arrest the horizontal movement of the flat work 78 and it is to be noted that the shelves 266 and 268, by opening rapidly in opposite directions from under the folded flat work 78, and with their movement being away from the center of the flat work, force the flat work 78 to drop onto the shelves 270 and 272 in a flat or horizontal position. This constitutes an important feature. The shelves 270 and 272 may be simply disposed below the shelves 266 and 268, or, if desired, vertical guides of any suitable construction can be employed to guide the pieces of flat work downwardly onto the shelves 270 and 272 to insure their being stacked up in a neat pile, but we have found that one desirable form of such guide or enclosure would be in the nature of solid side walls 334 which form a complete enclosure for the space intervening between the shelves 266, 268, 270 and 272 but which will not interfere with the closing and opening of said shelves. The solid walls 334 are preferably provided with suitably spaced and, if desired, suitably graduated openings 336 to permit gradual expulsion of the air to insure a gradual or retarded falling of the flat work 78 from the upper shelves 266 and 268 to the lower shelves 270 and 272. Thus the folded flat work 78, as shown in Fig. 16, which is slightly smaller in area than the inside area enclosed by the walls 334, will in falling off the shelves 266 and 268 act as a plunger with the air column below it acting as a cushion. The air thus compressed is gradually forced out through the openings 336 and the drop of the folded flat work 78 is thus cushioned.

While other means may be employed for the opening and closing of the shelves 266, 268, 270 and 272, we have found that the structure disclosed and which embodies the principle of a single revolution clutch works sufficiently rapidly and can be conveniently actuated by the photo-electric cells energizing the magnet 300. The details of the counting mechanism 312 and the regulating buttons 328 have not been shown for the reason that persons skilled in the art can construct the mechanism necessary to carry out the function desired, and for the further reason that the particular form of counter which we have developed will be disclosed and claimed in a separate application.

Having thus described our invention, what we claim as new and desire to secure by Letters Patent is:

1. A machine of the character stated comprising, a drying chamber, an endless conveyor, a plurality of poles carried thereby, for carrying the flat work into and through said drying chamber to dry the same, means near the feed end of said machine for draping the flat work along the center line thereof over said poles, and means disposed near the exit end of said drying chamber for lifting the flat work off said poles including a series of rollers, endless belts travelling over the same, means for normally retaining said rollers in an inoperative and closed position away from said poles, means for advancing said rollers towards said poles, means for simultaneously opening said rollers as they approach said poles to permit entry of the center line of the flat work draped on said poles therebetween, and means for again moving said rollers with the flat work travelling therebetween away from said poles.

2. A machine of the character stated including a drying chamber, an endless conveyor, a plurality of poles carried thereby, means for draping the flat work to be treated over said poles, said poles being of a tapered vertical cross section whereby a crease is formed in said flat work along its line of contact with said poles and means for propelling said poles through said drying chamber to dry said flat work.

3. The combination with a machine having a feed end and a delivery end, of a clamping mechanism reciprocable towards and away from said feed end and adapted to engage the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof off said pole.

4. The combination with a machine having a feed end and a delivery end, of a mechanism reciprocable towards and away from said feed end for engaging the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof over said pole, and means for picking and pressing said flat work substantially along the center line thereof off said pole.

5. The combination with a machine having a feed end and a delivery end, of a clamping mechanism reciprocable towards and away from said feed end and adapted to engage the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof over said pole, means for picking said flat work substantially along the center line thereof off said pole, and means for folding said flat work transversely of the center line thereof.

6. The combination with a machine having a feed end and a delivery end, of a clamping mechanism reciprocable towards and away from said feed end and adapted to engage the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof over said pole, means for picking said flat work substantially along the center line thereof off said pole, clamps on said poles for normally retaining said flat work thereon, means near the feed end of said machine for opening and retaining said clamps open while the flat work is draped over said poles, and means near the delivery end of said machine for opening said clamps to permit lifting of said flat work from said pole.

7. The combination with a machine having a feed end and a delivery end, of a clamping mechanism reciprocable towards and away from said feed end and adapted to engage the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof over said pole, means for picking said flat work substantially along the center line thereof off said pole, and means at the feed end of said machine for smoothing out said flat work while it is being drawn into said machine by said clamping mechanism and before it is draped on said pole.

8. The combination with a machine having a feed end and a delivery end, of a clamping mechanism reciprocable towards and away from said feed end and adapted to engage the edge of a piece of flat work at the feed end of said machine and to draw said flat work inwardly away from said feed end, a pole, means for propelling said pole between said feed end and said clamping mechanism when the latter is substantially at its furthest position away from said feed end whereby said flat work is draped substantially along the center line thereof over said pole, means for picking said flat work substantially along the center line thereof off said pole, means near the feed end of said machine for opening said clamping mechanism to receive the edge of said flat work, and means near the end of the movement of said clamping mechanism in the opposite direction for again opening said clamping mechanism to release said flat work, and means for retaining said clamping mechanism closed upon the edge of said flat work during its movement.

BERTRAND A. PARKES.
RALPH C. PARKES.